US011628938B2

(12) United States Patent
Matthews et al.

(10) Patent No.: US 11,628,938 B2
(45) Date of Patent: Apr. 18, 2023

(54) AIRCRAFT SEAT CUPHOLDER CONSOLE

(71) Applicant: Safran Seats USA LLC, Gainesville, TX (US)

(72) Inventors: Wade G. Matthews, Denton, TX (US); Eric L. Parks, Denton, TX (US); Andrew B. Severance, Fort Worth, TX (US)

(73) Assignee: Safan Seats USA LLC, Gainesville, TX (US)

( * ) Notice: Subject to any disclaimer, the term of this patent is extended or adjusted under 35 U.S.C. 154(b) by 172 days.

(21) Appl. No.: 15/548,680

(22) PCT Filed: Dec. 1, 2015

(86) PCT No.: PCT/US2015/063183
§ 371 (c)(1),
(2) Date: Aug. 3, 2017

(87) PCT Pub. No.: WO2016/133572
PCT Pub. Date: Aug. 25, 2016

(65) Prior Publication Data
US 2017/0369172 A1    Dec. 28, 2017

Related U.S. Application Data

(60) Provisional application No. 62/117,156, filed on Feb. 17, 2015.

(51) Int. Cl.
*B64D 11/06* (2006.01)
*B60N 3/10* (2006.01)
*B60N 3/00* (2006.01)

(52) U.S. Cl.
CPC .......... *B64D 11/0627* (2014.12); *B60N 3/002* (2013.01); *B60N 3/103* (2013.01); *B64D 11/0605* (2014.12); *B64D 11/0636* (2014.12)

(58) Field of Classification Search
CPC ............ B64D 11/0627; B64D 11/0605; B64D 11/0636; B60N 3/002; B60N 3/101; B60N 3/103
(Continued)

(56) References Cited

U.S. PATENT DOCUMENTS 4,300,709 A * 11/1981 Page, Jr. ................. B60R 7/043
224/275
4,821,931 A *  4/1989 Johnson ................. B60N 3/103
206/387.11
(Continued)

FOREIGN PATENT DOCUMENTS

DE         9417823 U1    1/1995
EP         1090806 A2 *  4/2001 ............. B60N 3/002
(Continued)

OTHER PUBLICATIONS

International Patent Application No. PCT/US2015/063183, Search Report and Written Opinion, dated Feb. 11, 2016.
(Continued)

*Primary Examiner* — Johnnie A. Shablack
(74) *Attorney, Agent, or Firm* — Kilpatrick Townsend & Stockton LLP

(57) ABSTRACT

Described are consoles for use in a passenger seat row. The console may include a base of a support material. The base may include a top surface, a first side wall, and a second side wall opposite the first side wall. A tray may be configured to be releasably affixed to the top surface of the base. The tray be manufactured as a piece of molded plastic. The molded plastic may be molded to include one or more storage compartments. A bottom of the molded plastic may be configured to fittingly mate with the top surface of the base. The base may further include one or more straps configured to secure the base to a passenger seat cushion, passenger seat
(Continued)

support structure, or a passenger seat restrain system. The one or more storage compartments may be a cupholder.

9 Claims, 3 Drawing Sheets

(58) Field of Classification Search
USPC .......................................................... 224/275
See application file for complete search history.

(56) References Cited

U.S. PATENT DOCUMENTS

| | | | | |
|---|---|---|---|---|
| 4,854,638 | A * | 8/1989 | Marcus | A47D 1/103 297/256.11 |
| 5,183,311 | A * | 2/1993 | Meeker | A47D 1/004 297/151 |
| 5,470,002 | A * | 11/1995 | DiStefano | A47J 47/145 206/522 |
| 5,651,523 | A * | 7/1997 | Bridges | B60N 3/103 248/311.2 |
| 6,936,791 | B1 * | 8/2005 | Baldwin | A47J 36/2483 219/387 |
| 7,261,369 | B2 * | 8/2007 | Ahad | B64D 11/06 297/115 |
| 7,300,103 | B1 * | 11/2007 | Grays | A47D 1/0085 297/119 |
| 7,585,021 | B2 * | 9/2009 | Tabata | B29C 44/1257 297/188.14 |
| 8,152,238 | B2 * | 4/2012 | Timme | B08B 3/02 297/250.1 |
| 8,632,123 | B2 * | 1/2014 | Barile | A47C 7/622 297/188.2 |
| 9,387,786 | B2 * | 7/2016 | Weiner | B60N 3/002 |
| 9,452,701 | B1 * | 9/2016 | Allen | B60N 3/103 |
| 10,343,577 | B1 * | 7/2019 | Medoro | B60N 2/79 |
| 11,186,213 | B2 * | 11/2021 | Stock | B60N 3/101 |
| 2004/0129747 | A1 * | 7/2004 | Maierholzner | B60N 3/106 224/544 |
| 2005/0051584 | A1 * | 3/2005 | Shelmon | B60N 3/002 224/275 |
| 2006/0076379 | A1 * | 4/2006 | Hussaini | F25D 31/005 224/275 |
| 2006/0091707 | A1 * | 5/2006 | Ahad | B64D 11/0693 297/145 |
| 2007/0001495 | A1 * | 1/2007 | Boyle | B60N 2/2806 297/253 |
| 2007/0119348 | A1 * | 5/2007 | Evans | B60N 3/002 108/44 |
| 2007/0176469 | A1 * | 8/2007 | Day | B60N 2/28 297/153 |
| 2012/0006871 | A1 * | 1/2012 | Strohecker | B60N 3/103 224/275 |
| 2015/0343933 | A1 * | 12/2015 | Weiner | B60N 3/103 224/275 |
| 2015/0375685 | A1 * | 12/2015 | Krishnan | B60R 11/0252 296/24.34 |
| 2017/0297499 | A1 * | 10/2017 | Darrow | B60R 7/043 |
| 2018/0009356 | A1 * | 1/2018 | Liebowitz | B60N 3/002 |
| 2018/0162251 | A1 * | 6/2018 | Bohlke | B60N 2/753 |

FOREIGN PATENT DOCUMENTS

| | | | | |
|---|---|---|---|---|
| FR | 2981895 A1 * | 5/2013 | | B60R 7/043 |
| FR | 2981895 A1 | 5/2013 | | |
| GB | 2223466 A * | 4/1990 | | B60N 3/103 |
| GB | 2223466 A | 4/1990 | | |

OTHER PUBLICATIONS

"DER BMW X1. Original BMW Zubehor", DER BMW X1. Original BMW Zubehor, Jun. 1, 2012, XP855246168, Munich, Germany, Retrieved online on Jan. 29, 2016: http://www.bmw.de/dam/brandBM/marketDE/countryDE/topics/service-zubehoer/original-bmw-zubehoer/downloads/kataloge/pdf/bmw_accessories_catalogue_x1_e84.pdf.download.1373955355615.pdf.
Europe Patent Application No. 15808525.8, Communication pursuant to Article 94(3) EPC (Office Action), dated Nov. 8, 2019.
Europe Patent Application No. 15808525.8, Communication pursuant to Article 94(3) EPC (Office Action), dated Dec. 6, 2019.
Europe Patent Application No. 15808525.8, Communication under Rule 71(3) EPC (Intention to Grant), dated Mar. 23, 2021.
Europe Patent Application No. 15808525.8, Decision to grant a European patent pursuant to Article 97(1) EPC, dated Jul. 15, 2021.

* cited by examiner

AIRCRAFT SEAT CUPHOLDER CONSOLE

CROSS-REFERENCE TO RELATED APPLICATIONS

This application is related to and claims priority benefits from U.S. Provisional Patent Application Ser. No. 62/117,156 ("the '156 application"), filed Feb. 17, 2015, entitled Aircraft Seat Cupholder Console. The '156 application is herein incorporated in its entirety by this reference.

FIELD OF THE INVENTION

The field of the invention relates to consoles for use in passenger seats.

BACKGROUND

The present disclosure generally relates to consoles for use in passenger seats. In particular embodiments, aircraft seat cupholder consoles may be provided.

Aircraft typically include foldable tray tables for the purpose of allowing passengers the ability to rest cups and other articles at seating areas in the aircraft. Historically, the flip out tables have been provided adjacent to, or on the back of the next seat in sequence for the purpose of enabling passengers to support cups of other articles. As such, economy class aircraft seating typically does not provide the passenger with a cupholder location except on the tray table.

Embodiments of the present invention may provide a removable and stowable console that may expand airline offerings and/or improve passenger travel experience.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention a portable console for use in a passenger seat row may be provided. The portable console may include a base comprising a support material (e.g., foam). The base may include a top surface, a first side wall, and a second side wall opposite the first side wall. A tray may be configured to be releasably affixed to the top surface of the base. The tray may be manufactured as a piece of molded plastic. The molded plastic may be molded to include one or more storage compartments. A bottom of the molded plastic may be configured to fittingly mate with the top surface of the base. The base may further comprises one or more straps configured to secure the base to a passenger seat cushion, passenger seat support structure, or a passenger seat restrain system.

In some embodiments, the first side wall of the base may include a first routing channel extending from an exterior surface of the first side wall to an interior surface of the first side wall. The second side wall of the base may include a second routing channel extending from an exterior surface of the second side wall to an interior surface of the second side wall. The first and second routing channels may be dimensioned to receive a seat belt latch therethrough.

Optionally, the first and second routing channels may be elongate channels that are at an angle greater than zero relative to horizontal. The first and second routing channels may be at an angle between 20 to 60 degrees relative to horizontal.

In certain embodiments, the one or more straps may be a front strap configured to secure a front of the base to a passenger seat cushion or a passenger seat support structure. The one or more storage compartments may be one or more cupholders.

A top surface of the molded plastic may include a recessed surface having an area that covers a majority of the top surface of the piece of molded plastic.

In further aspects of the present invention, a portable console for use in a passenger seat row may be provided that includes a base comprising a support material. The base may include a top surface, a first side wall, a second side wall opposite the first side wall, and an interior defined by the top surface, the first side wall, and the second side wall. The first side wall may include a first routing channel extending from an exterior surface of the first side wall to an interior surface of the first side wall. The second side wall may include a second routing channel extending from an exterior surface of the second side wall to an interior surface of the second side wall. The first and second routing channels may be dimensioned to receive a seat belt latch therethrough. A tray may be configured to be releasably engageable with the top surface of the base. The tray may include a top surface surrounded by a raised perimeter edge such that the top surface is recessed relative to the perimeter edge. The tray may further include one or more cupholders.

Optionally, a front end of the tray may be sloped relative to the top surface of the tray. The first and/or second routing channels may be dimensioned to receive a seat belt buckle therethrough that corresponds with the seat belt latch.

The interior of the console may further be defined by a front side wall and a back side wall of the base. The interior of the console may be dimensioned to house the seat belt buckle and the seat belt latch such that the seat belt latch may engage with the seat belt buckle and be stored in the interior of the console during use of the console.

The tray may be manufactured as a molded plastic. The molded plastic may form a first cupholder and a second cupholder. A bottom surface of the tray may be molded to fittingly mate with a shape of the top surface of the base.

The tray may engage with the base in a releasable friction fit engagement. Optionally, the console may further include an engagement feature configured to releasably couple the tray with the base. The top surface of the base may include the engagement feature and a bottom surface of the tray may include a corresponding engagement feature. The engagement feature and the corresponding engagement feature may be a hook and loop fastener system.

The support material of the base may be a foam material. The base further may further include a cover comprising a leather or textile material to cover the foam material.

Optionally, embodiments of the console may include a front strap coupled with the base at a first end of the front strap. A free end of the front strap opposite the first end may be configured to couple with a passenger seat cushion or a passenger seat support structure to secure a front portion of the base to a passenger seat of the passenger seat row. In some embodiments, the console does not include moving parts.

In further aspects of the present invention, a portable console for use in an aircraft passenger seat row may be provided that includes a base comprising a support material. The base may have a top surface, a first side wall, a second side wall opposite the first side wall, and an interior defined by the top surface, the first side wall, and the second side wall. The first side may include a first routing channel extending from an exterior surface of the first side wall to an interior surface of the first side wall. The second side wall may include a second routing channel extending from an exterior surface of the second side wall to an interior surface of the second side wall. The first and second routing channels may be dimensioned to receive a seat belt latch of the aircraft passenger seat row therethrough. A tray may be configured to be releasably affixed to the top surface of the base. The tray may be manufactured as a piece of molded plastic. The molded plastic may be formed to include one or more cupholders. The piece of molded plastic may be further formed to include a recessed surface having an area that covers a majority of the top surface of the formed tray. A bottom of the molded plastic may be configured to fittingly mate with the top surface of the base.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Economy class aircraft seating typically does not provide the passenger with a cupholder location except on the tray table. Embodiments of the present invention may provide customers occupying a seat with an adjacent unoccupied seat an additional stowage location for drinks and other amenities. Certain embodiments may also be capable of being removed from the seat and stowed on- or off-board the aircraft when not in use.

For example, in many aircraft, triple seats are provided throughout the cabin. In circumstances where the one of the seats is left unoccupied by a passenger (e.g., the center seat), the portable console may be positioned in the empty seat and may provide additional storage locations (e.g., cupholders, pockets, or the like) or other surfaces for supporting passenger foods, drinks, and/or belongings. Such a console may allow airlines to market an economy seat as a type of premium economy seat when an adjacent seat is provided with embodiments of the console disclosed herein.

The described embodiments of the invention provide portable and removable consoles for passenger seats. In particular embodiments, the console may be a cupholder console for use in aircraft passenger seats. It should be understood however, that while the cupholder consoles are discussed for use with aircraft seats, they are by no means so limited. Rather, embodiments of the cupholder consoles may be used in passenger seats or other seats of any type or otherwise as desired.

Figure 1:
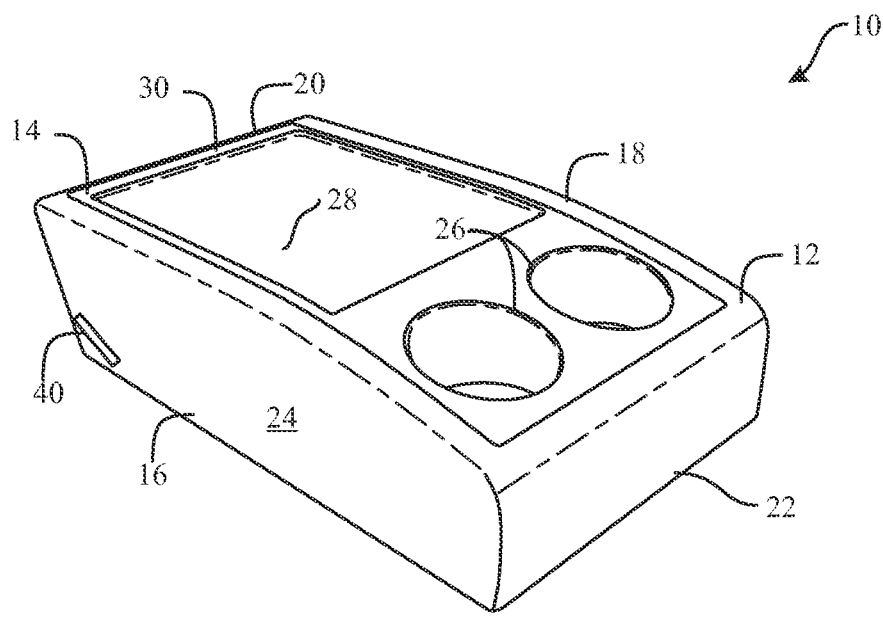
FIG. 1 shows a cupholder console, according to certain embodiments of the present invention.
Figure 2:
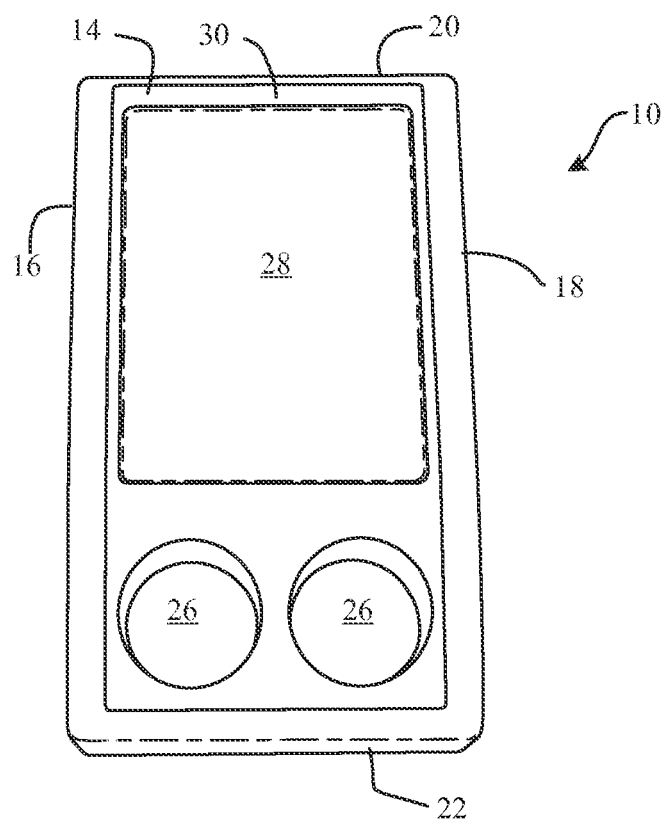
FIG. 2 shows a top view of the cupholder console of FIG. 1 according to certain embodiments of the present invention.
Figure 3:
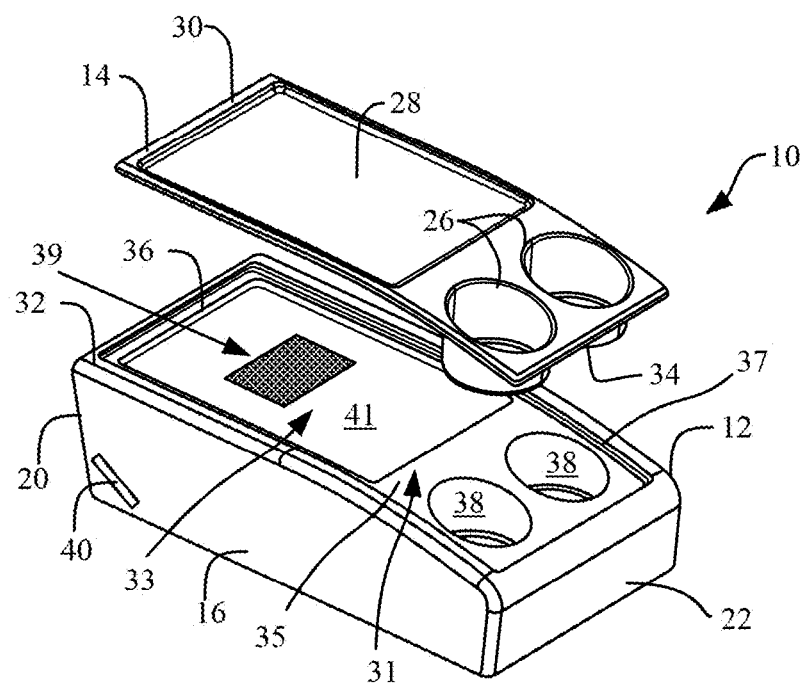
FIG. 3 shows an exemplary exploded view of the cupholder console of FIG. 1 according to certain embodiments of the present invention.

According to certain embodiments of the present invention, as shown in FIGS. 1-6, a cupholder console 10 may be provided. FIG. 1 shows a cupholder console 10 according to certain embodiments of the present invention. FIG. 2 shows a top view of the cupholder console 10 of FIG. 1 according to certain embodiments of the present invention. FIG. 3 shows an exemplary exploded view of the cupholder console 10 of FIG. 1 according to certain embodiments of the present invention. The cupholder console 10 may include a base 12 and a tray 14. The base 12 may include a first side wall 16 and a second side wall 18 opposite the first side wall 16. The base 12 may further include a back wall 20 and a front wall 22 opposite the back wall 20. In some embodiments, the first side wall 16, the second side wall 18, the front wall 22, and the back wall 20 may define a hollow interior space of the base 12. A top surface 32 of the base is at a top end of the walls 16, 18, 20, and 22, and the top surface 32 includes a first receiving area 31 and a second receiving area 33. The first receiving area 31 includes a first surface 35 that is recessed relative to the top surface 32 and a first perimeter edge 37 surrounding the first surface 35. The second receiving area 33 is within the first receiving area 31 and includes a second surface 41 that is recessed relative to the first surface 35 and a second perimeter edge 36 surrounding the second surface 41. Receptacles 38 may be included within the first receiving area 31. The base 12 may be constructed of a foam cushion or other flexible support material. Optionally, the base 12 may be constructed from one of more of the following: aluminum, stainless steel, aramid fibers, polycarbonate, polypropylene, other metallic materials, composite materials, or other similar materials. In some embodiments, the base 12 may include a cover 24 that covers the foam cushion or flexible support material. The cover 24 may be a leather or other textile material.

As shown in FIG. 3, the tray 14 may be releasably affixed to the top of the base 12. The tray 14 may be formed to include one or more storage compartments 26. The storage compartments 26 may be cupholders as illustrated in the exemplary cupholder console 10. The cupholders may have circular cross-sections that are configured to receive and secure a passenger's cup therein. While illustrated as having a circular cross-section to define a cylindrical volume for receiving a cup therein, it should be understood that other configurations are possible. For example, the storage compartments 26 may be configured to store other objects or other items with different shapes. Accordingly, storage compartments 26 may have rectangular or triangular cross-sections, as needed, that may define prismatic volumes for receiving passenger belongings, food, and/or drinks.

The tray 14 may further include a recessed surface 28. The recessed surface 28 may be recessed relative to a surrounding perimeter edge 30. In some embodiments, the recessed surface 28 may have an area that forms the majority of the top surface of tray 14. The raised perimeter edge 30 relative to the recessed surface 28 may minimize objects or liquids from inadvertently moving from the recessed surface 28 and off the console 10. This may be advantageous if due to turbulence or the like, for example, liquid may be spilled from a container that is resting on the recessed surface 28. The perimeter edge 30 may facilitate at least some containment of the spilled liquid to the recessed surface 28.

In some embodiments, the tray 14 may be releasably coupled with the top 32 of the base 12 as shown in FIG. 3. In certain embodiments, a top surface 32 of base 12 may be configured to fittingly mate with a bottom surface 34 of tray 14. For example, the top surface 32 of base 12 may include the recessed surface 41 and the raised perimeter edge 36 that are configured to accommodate the recessed surface 28 and the raised perimeter edge 30 of tray 14. Additionally, top surface 32 of base 12 may further include receptacles 38 configured to accommodate the bottom of the storage compartments 26 formed by tray 14. Optionally, the tray 14 may be manufactured as a piece of molded plastic. In some embodiments, the tray 14 may be formed from a piece of molded plastic.

In some embodiments, the top surface 32 of base 12 may mate with the bottom surface 34 of tray 14 in a friction fit engagement. Optionally, engagement features 39 may be provided to couple the top surface 32 of base 12 with the bottom surface 34 of tray 14. For example, in some embodiments, a hook and loop fastener system may be provided that releasably couples the tray 14 with the base 12. This may be desired if, for example, the tray 14 is soiled, stained, damaged, or in need of replacement. In such a circumstance, the tray 14 may be removed from the base 12 for cleaning or replacement purposes. Alternatively, the base 12 may be configured to couple with a plurality of trays 14, where the plurality of trays 14 may provide alternative functionality or color schemes. For example, while tray 14 is illustrated as providing one or more cupholder storage compartments 26 and a recessed surface 28, it should be understood that tray 14 may provide other types of storage compartments 26 and/or more or less storage compartments 26 as needed. In some embodiments of console 10, one, three, four, five or more cupholders may be provided. In alternative embodiments of console 10, no cupholders may be provided. In some embodiments, the tray 14 may include storage compartments 26 having lids for enclosing the contents of the storage compartment 26 therein.

In some embodiments, console 10 does not include any moving parts. This may reduce manufacturing costs and may reduce maintenance requirements.

In some embodiments that are for use in aircraft passenger seats, the console 10 may include features that allow the console to be certified for use during aircraft taxi, takeoff, and landing. For example, console 10 may be removable from a passenger seat and stowable during aircraft taxi, takeoff, and landing. Optionally, the console 10 may include features configured to releasably couple the console 10 with a passenger seat such that the cupholder console 10 may be secured to an remain in the passenger seat during taxi, takeoff, and landing.

Figure 4:
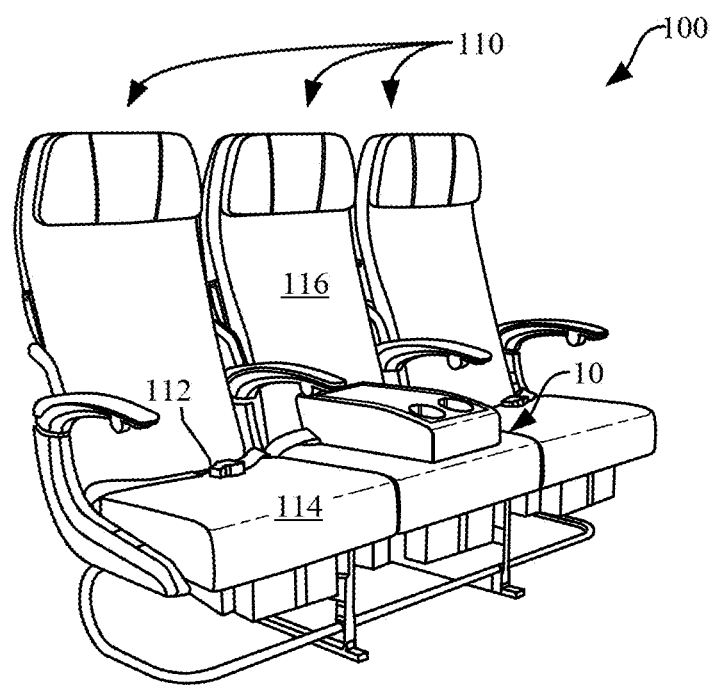
FIG. 4 shows the exemplary cupholder console of FIG. 1 coupled with a passenger seat of a row of passenger seats according to certain embodiments of the present invention.
Figure 5:
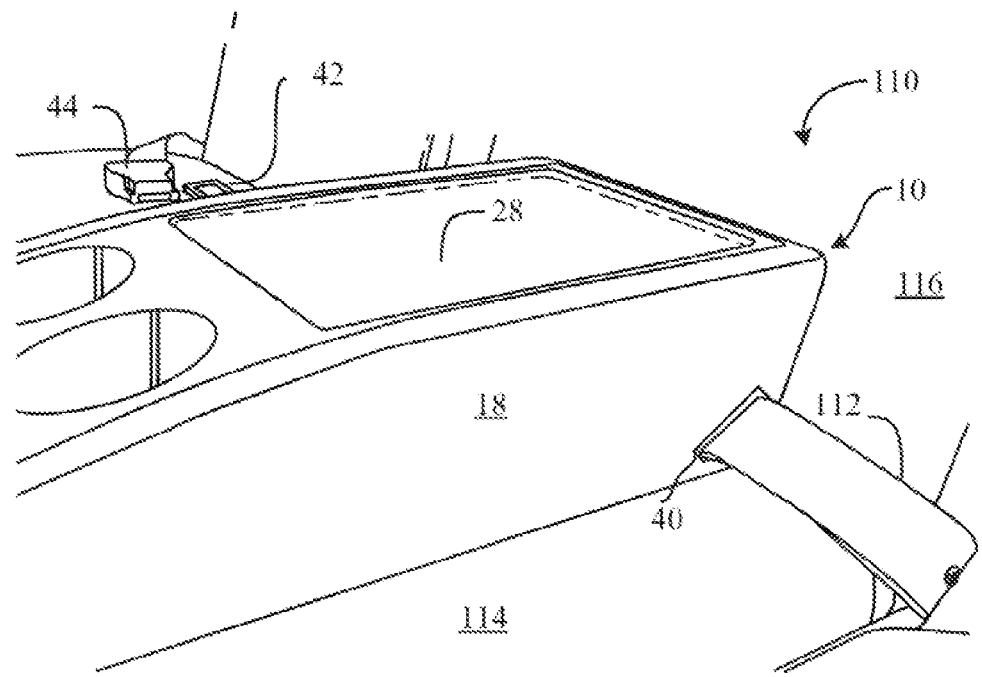
FIG. 5 shows details of a coupling between the exemplary cupholder console of FIG. 1 with a harness of the passenger seat according to certain embodiments of the present invention.

For example FIG. 4 shows the exemplary cupholder console 10 of FIG. 1 coupled with a passenger seat 110 of a row 100 of passenger seats 110 according to certain embodiments of the present invention. FIG. 5 shows details of a coupling between the exemplary cupholder console 10 of FIG. 1 with a harness/restraint system 112 of the passenger seat 110 according to certain embodiments of the present invention. As shown in FIGS. 4 and 5, the first side wall 16 and the second side wall 18 may include a routing channel 40 that extends from an exterior surface of the first side wall 16 and second side wall 18, respectively, to an interior surface of the first side wall 16 and second side wall 18, respectively. The routing channel 40 may be an elongate slit. The routing channel 40 may be dimensioned such that a seat belt latch 42 of the passenger seat 110 and/or a corresponding seat belt buckle 44 may be routed therethrough. In some embodiments, the routing channel 40 is at an angle relative to horizontal. For example, the routing channels 40 may be at an angle between 0-90 degrees, optionally between 20-70 degrees relative to horizontal. Further, as can be seen in FIG. 5, the back wall 20 may be at an angle relative to the seat base 114. Thus, in some embodiments, the back wall 20 may be at an angle relative to the bottom of the first side wall 16 and the second side wall 18 so that the top surface of the console 10 abuts the seat backrest 116.

In order to couple the console 10 to a seat 110, the seat belt latch 42 may be routed through the routing channel 40 of the first side wall 16 and the routing channel 40 of the second side wall 18. Thereafter, the seat belt latch 42 may be coupled with the seat belt buckle 44. The seat belt restraint system 42, 40 may then be tightened to secure the console 10 to the seat.

Optionally, the routing channels 40 may be dimensioned so as to receive the seat belt buckle 44 therethrough. Accordingly, in some embodiments, in order to couple the console 10 to a seat 110, the seat belt latch 42 may be routed through the routing channel 40 of the first or second side wall 16, 18, and then the seat belt buckle 44 may be routed through the opposing routing channel 40. Thereafter, the seat belt latch 42 and the seat belt buckle 44 may be engaged with one another. The interior of the base 12 of console 10 may be dimensioned so that the seat belt buckle 44 and the seat belt latch 42 may be stored therein during console use.

In still further aspects, console 10 may include other engagement features configured to couple with the seat cushion, the seat support structure, and/or the seat restraint system. For example, the console 10 may include a belt having a latch that is configured to couple with the seat belt buckle 44 of the existing restraint system 112. The console 10 may further include a buckle that is configured to couple with the seat belt latch 42 of the existing restraint system 112.

Figure 6:
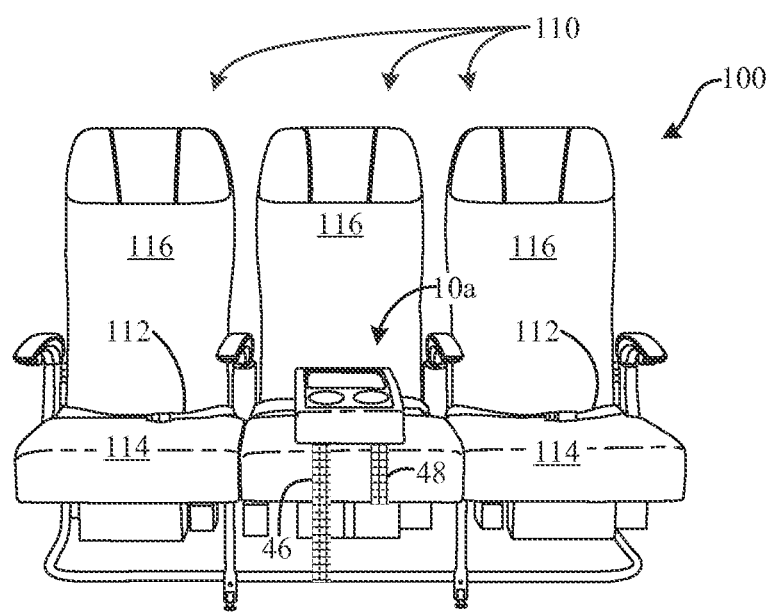
FIG. 6 shows an exemplary cupholder console including optional front straps according to certain embodiments of the present invention.

FIG. 6 shows an exemplary cupholder console 10a including optional front strap 46 and front strap 48 according to certain embodiments of the present invention. The front straps 46, 48 may be configured to secure a front portion of console 10a to a passenger seat 110. For example, a first end of the front strap 46 and a first end of the front strap 48 may be coupled to a front portion of console 10a. The second end of the front strap 46 and the second end of the front strap 48 may be configured to couple with a portion of the passenger seat row 100 to secure a front portion of the console 10a to the passenger seat 110. For example, the front strap 46 may be configured to couple with the passenger seat support structure. In the illustrated embodiment, the front strap 46 may be configured to couple with the baggage bar of the passenger seat support structure (e.g., via hooks, or other engagement features). The front strap 48 may be configured to couple with a passenger seat base support structure or a passenger seat cushion or the like (e.g., via hooks, or other engagement features). While console 10a is illustrated as including both a front strap 46 and a front strap 48, it should be understood that some embodiments may include one, both, or neither of the straps 46, 48. Other embodiments may include a plurality of straps 46 and/or a plurality of straps 48 to secure the front portion of a console.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A portable console for use in a passenger seat row, the portable console comprising:
   a base comprising a support material, the base including:
      a top side comprising a top surface, the top side comprising:
         a first receiving area comprising a first surface recessed relative to the top surface and a first perimeter edge surrounding the first surface;
         a second receiving area within the first receiving area, the second receiving area comprising a second surface recessed relative to the first surface and a second perimeter edge surrounding the second surface;
         a first receptacle within the first receiving area at a location different from the second receiving area; and
         a second receptacle within the first receiving area at a location different from the second receiving area and different from the first receptacle; and
      a plurality of side walls extending downwards from the top side, wherein the plurality of side walls and the top side define an interior of the base; and
   a tray configured to releasably engage the top side of the base, wherein the tray comprises:
      a first storage compartment;
      a second storage compartment; and
      a bottom surface;
      a top surface; and
      a recessed tray surface in the top surface, wherein the recessed tray surface is recessed relative to the top surface of the tray and is surrounded by a recessed tray perimeter edge,
   wherein a profile of the bottom surface of the tray complements the top surface of the base and is configured to fittingly mate with the top surface of the base,
   wherein the first receptacle of the base is configured to selectively receive the first storage compartment of the tray, the second receptacle is configured to receive the second storage compartment, and the second receiving area of the base is configured to receive the portion of the tray comprising the recessed tray surface, and
   wherein the plurality of side walls comprises a first side wall, a second side wall, a front side wall, and a back side wall, and wherein the back side wall of the base extends at an angle greater than ninety degrees relative to a bottom side of the first and second side walls.

2. The portable console of claim 1, wherein a front end of the tray is sloped relative to the top surface of the tray.

3. The portable console of claim 1, wherein the tray comprises molded plastic, and wherein the first storage compartment is a first cupholder and the second storage compartment is a second cupholder.

4. The portable console of claim 3, wherein the tray engages with the base in a releasable friction fit engagement.

5. The portable console of claim 1, further comprising an engagement feature within the second receiving area of the base, wherein the engagement feature is configured to releaseably couple the tray with the base.

6. The portable console of claim 5, wherein a bottom surface of the tray includes a corresponding engagement feature.

7. The portable console of claim 6, wherein the engagement feature and the corresponding engagement feature comprise a hook and loop fastener system.

8. The portable console of claim 1, wherein the support material of the base comprises a foam material and wherein the base further comprises a cover comprising a leather or textile material configured to cover the foam material.

9. The portable console of claim 1, further comprising a front strap coupled with the base at a first end of the front strap, a free end of the front strap opposite the first end configured to couple with a passenger seat cushion or a passenger seat support structure to secure a front portion of the base to a passenger seat of the passenger seat row.

* * * * *